(12) United States Patent
Wilson et al.

(10) Patent No.: US 10,761,944 B2
(45) Date of Patent: *Sep. 1, 2020

(54) TECHNIQUES FOR DEDUPLICATION OF MEDIA CONTENT

(71) Applicant: NetApp, Inc., Sunnyvale, CA (US)

(72) Inventors: Michael G. Wilson, San Jose, CA (US); Mark W. Storer, Walnut Creek, CA (US)

(73) Assignee: NetApp, Inc., Sunnyvale ( * ) Notice: Subject to any disclaimer, the term of this patent is extended or adjusted under 35 U.S.C. 154(b) by 1418 days.

This patent is subject to a terminal disclaimer.

(21) Appl. No.: 14/177,298

(22) Filed: Feb. 11, 2014

(65) Prior Publication Data

US 2015/0227436 A1    Aug. 13, 2015

(51) Int. Cl.
| | |
|---|---|
| G06F 7/00 | (2006.01) |
| G06F 11/14 | (2006.01) |
| G06F 16/174 | (2019.01) |
| H04L 9/32 | (2006.01) |

(52) U.S. Cl.
CPC ...... *G06F 11/1453* (2013.01); *G06F 16/1748* (2019.01); *H04L 9/3239* (2013.01); *H04L 2209/60* (2013.01)

(58) Field of Classification Search
CPC ............. G06F 17/30017; G06F 16/1748
USPC ........................................... 707/692
See application file for complete search history.

(56) References Cited

U.S. PATENT DOCUMENTS

| | | | | |
|---|---|---|---|---|
| 2009/0112790 A1* | 4/2009 | Hama | ................ | G06F 11/0751 |
| 2011/0219039 A1* | 9/2011 | Xu | ................ | G06F 16/40 707/796 |
| 2012/0166401 A1* | 6/2012 | Li | ................ | G06F 16/1748 707/692 |
| 2013/0060739 A1* | 3/2013 | Kalach | ................ | G06F 16/1752 707/692 |
| 2013/0317936 A1* | 11/2013 | Hughes | ................ | G06F 16/68 705/26.5 |
| 2014/0025948 A1* | 1/2014 | Bestler | ................ | H04L 9/0863 713/167 |
| 2014/0052907 A1* | 2/2014 | Starr | ................ | G06F 3/0613 711/111 |
| 2014/0281313 A1* | 9/2014 | Danilak | ................ | G06F 16/2272 711/162 |
| 2015/0088839 A1* | 3/2015 | Jones | ................ | G06F 3/0608 707/692 |
| 2015/0134623 A1* | 5/2015 | Liu | ................ | G06F 11/1453 707/692 |
| 2015/0213049 A1* | 7/2015 | Kleiman | ................ | G06F 16/1752 707/692 |

OTHER PUBLICATIONS

Content-Aware Segmentation, http://permabit.com/oem/technologies/content-aware-segmentation/, Retrieved on Feb. 11, 2014, 1 page.

* cited by examiner

*Primary Examiner* — Eliyah S. Harper
(74) *Attorney, Agent, or Firm* — Cooper Legal Group, LLC

(57) ABSTRACT

Examples are disclosed for identifying duplicated media content in a plurality of media files. In some examples, according to a media file format, media content sequences may be located and duplicated media content sequences identified. For these examples, at least a portion of the identified duplicated media content sequences may then be deleted or not stored at a storage system. Other examples are described and claimed.

20 Claims, 9 Drawing Sheets

Format 400

| Metadata 312 |||||| 
|---|---|---|---|---|---|
| A.S. Location Info. 422-1 | V.S. Location Info. 424-1 | T.S. Location Info. 426-1 | A.S. Location Info. 422-1 | V.S. Location Info. 424-1 | T.S. Location Info. 426-1 |

*FIG. 4*

Code 500 input: media file information
output: chunk list (SHA-1 signature)
parse media file header
for given media content sequences do
|     if sequence-based chunking then
        apply SHA-1 (sequence)
        add signature (sequence) to chunk list
    else
        for all samples in given media content sequence do
            apply SHA-1 (sample)
            add signature (sample) to chunk list
        end
    end
end

RECEIVE INFORMATION ASSOCIATED WITH A PLURALITY OF MEDIA FILES SEPARATELY ARRANGED IN ONE OR MORE MEDIA FILE FORMATS AND HAVING DUPLICATED MEDIA CONTENT
802

DETERMINE LOCATIONS OF MEDIA CONTENT SEQUENCES INCLUDED IN EACH OF THE PLURALITY OF MEDIA FILES BASED ON RESPECTIVE MEDIA FILE FORMATS, THE MEDIA CONTENT SEQUENCES INCLUDING VIDEO, AUDIO OR TEXT MEDIA CONTENT
804

IDENTIFY AT LEAST A PORTION OF THE DUPLICATED MEDIA CONTENT IN EACH OF THE PLURALITY OF MEDIA FILES BASED ON THE DETERMINED LOCATIONS OF THE MEDIA CONTENT SEQUENCES
806

STORE IDENTIFIED DUPLICATED MEDIA CONTENT AT A STORAGE SYSTEM FOR A FIRST MEDIA FILE FROM AMONG THE PLURALITY OF MEDIA FILES
808

CAUSE IDENTIFIED DUPLICATED MEDIA CONTENT FOR ALL OTHER MEDIA FILES AMONG THE PLURALITY OF MEDIA FILES TO BE DELETED FROM OR NOT STORED TO THE STORAGE SYSTEM
810

FIG. 8

TECHNIQUES FOR DEDUPLICATION OF MEDIA CONTENT

BACKGROUND

With the proliferation of smart devices, surveillance gadgets and other types of media capture devices, media content creation is growing at an exponential pace. This, in turn, leads to a corresponding increase in an amount of media content stored in public clouds/repositories such as YouTube™, Dropbox™, etc. Furthermore, professionally created media content like movies, television shows, documentaries, etc. stored in subscription-based media content repositories may be accessed or consumed via on-line streaming by media content providers such as Netflix™, Hulu™ or Comcast™. Often, multiple copies of the same media content that primarily includes video but may also include associated audio or text may be stored at a given media content repository.

BRIEF DESCRIPTION OF THE DRAWINGS

FIG. 4 illustrates an example second format.
FIG. 5 illustrates an example code.
FIG. 8 illustrates an example logic flow.

DETAILED DESCRIPTION

As contemplated in the present disclosure, multiple copies of the same media content may be stored in repositories that allow consumers to access that media content. However, traditional techniques associated with deduplication for other types of non-media content files have yielded low storage efficiency savings. A reason for the low storage efficiency saving may be due to differences between media files that may include copies of the same media content. These differences may include: i) presence of additional audio data (e.g., a director's commentary), ii) presence of audio data in different languages, iii) presence of closed captions, iv) copies of same video that have been recorded by different digital video recorders (DVRs) with different commercial/advertisement content, v) use of different encoding algorithms or, vi) difference in video frame rate/resolution. Thus, conventional wisdom has been that fix-sized block or chunk deduplication techniques may not yield acceptable storage efficiency savings for media content repositories. Also, variable-sized chunking techniques such the Rabin fingerprint do not consider the actual content of a media content file and thus may not account for the above-mentioned differences. It is with respect to these and other challenges that the examples described herein are needed.

According to some examples, techniques for deduplication of media content may be implemented. These techniques may include receiving information associated with a plurality of media files separately arranged in one or more media file formats and having duplicated media content. For these examples, the techniques may also include determining, by circuitry, locations of media content sequences included in each of the plurality of media files based on respective media file formats. The media content sequences may include video, audio or text media content. The techniques may also include identifying at least a portion of the duplicated media content in each of the plurality of media files based on the determined locations of the media content sequences. In some examples, identified duplicated media content may be stored at a storage system for a first media file from among the plurality of media files and identified duplicated media content for all other media files among the plurality of media files may then be deleted from or not stored to the storage system.

Figure 1:
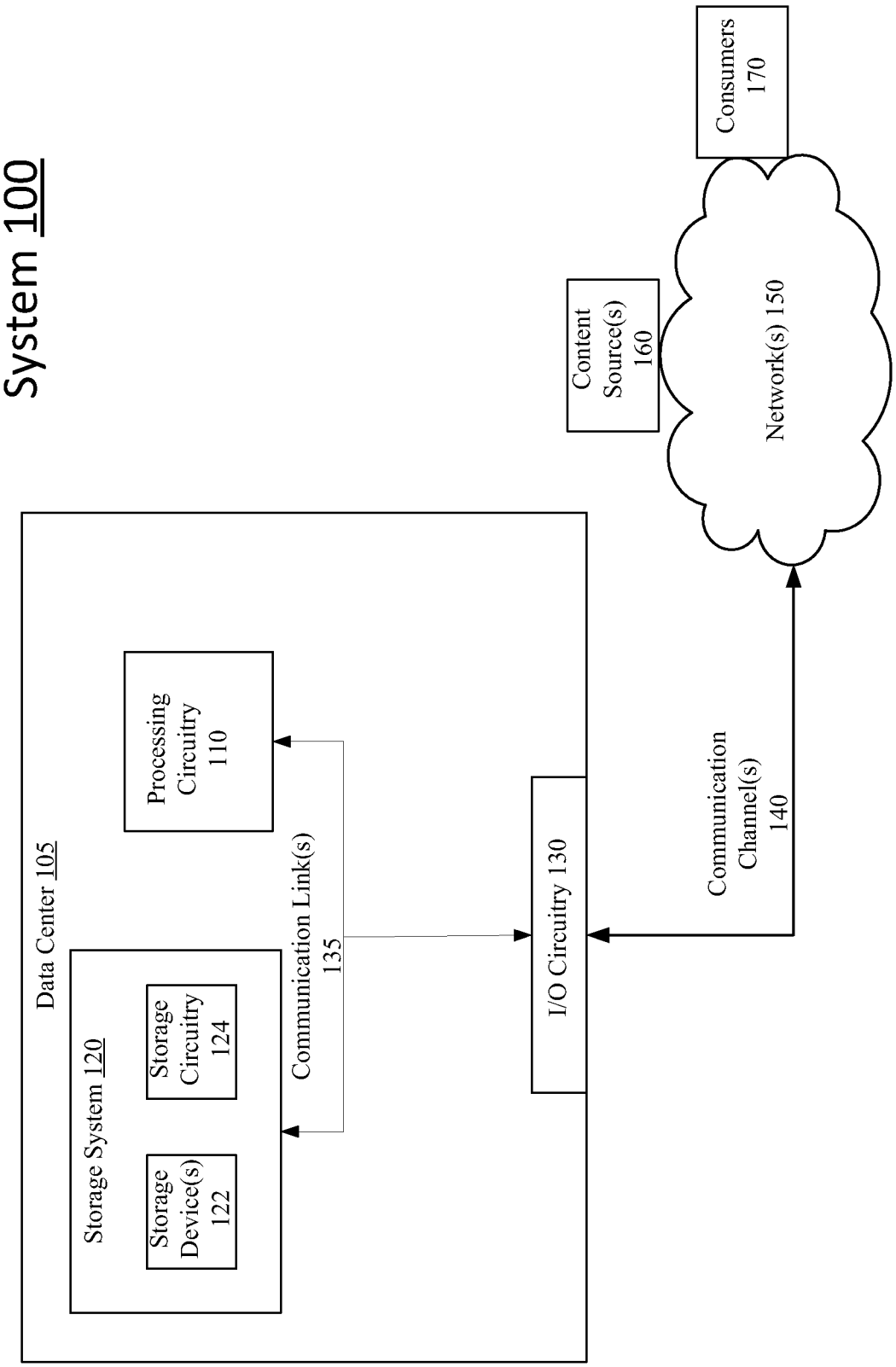
FIG. 1 illustrates an example system.

FIG. 1 illustrates an example system 100. As shown in FIG. 1, system 100 includes a data center 105 having a circuitry 110, a storage system 120 and input/output circuitry 130 coupled via communication link(s) 135. Also as shown in FIG. 1, communication channel(s) 140 may be coupled between data center 105 and one or more network(s) 150 that may also enable content source(s) 160 and/or consumers 170 to access data center 105 through network(s) 150.

In some examples, circuitry 110 and/or I/O circuitry 130 may include logic and/or features to process or route media files separately arranged in one or more media file formats to/from storage device(s) 122 at storage system 120. Also, as described more below, storage system 120 may include storage circuitry 124 that may further include logic and/or features to reduce or eliminate duplicated or redundant media content in the media files to be stored at storage device(s) 122. The media content may include video media content as well as audio or text media content that may be associated with the video media content. For these examples, circuitry 110, I/O circuitry 130 or storage circuitry 124 may include, singly or in any combination, analog circuitry, digital circuitry, hardwired circuitry, programmable circuitry, co-processor circuitry, state machine circuitry, and/or memory that may include program instructions that may be executed by programmable circuitry to execute these logic and/or features to process or route media files and/or or reduce duplicated media content included in these media files.

According to some examples, circuitry 110 may include a host processor or central processing unit (CPU) having one or more processor cores or include a multi-socket processor package to process media files stored to or received from storage system 120. I/O circuitry 130 may include network interface circuitry to receive/transmit packets associated with media content included in media files stored to or received at storage system 120. For these examples, data center 105 may be a storage server arranged to serve as a repository for media content included in the media files. The media content, for example, may have been created by content source(s) 160 and following storage to storage system 120, consumers 170 may access media content included in the media files through network(s) 150 via communication channel(s) 140.

In some examples, circuitry 110, storage system 120 and I/O circuitry 130 may be located on or with separate servers included in a data center 105 that includes a multitude of functional servers. For example, I/O circuitry 130 may located on or with one or more network servers arranged to receive/transmit packets associated with media content included in media files stored or to be stored at storage system 120. Storage system 120 may be located on or with one or more storage servers that may each house at least one storage device arranged to store the media files. Also, circuitry 110 may be located on or with one or more servers to process media files and/or packets containing media content destined for or received from storage system 120.

For these examples, communication link(s) 135 may include network-based communication links that may enable these separate functional servers to function as a shared pool of configurable computing resources or as a cloud computing network that may be configurable to store and/or access media content.

According to some examples, in either a single server example or a cloud computing network example, various use cases for storing media content may exist. A first use may be cloud storage of media content, a second use may be streaming video providers, a third use may be cloud-based DVRs, a fourth use may be video production environments and a fifth use may be video repositories. For any of the above use cases, reducing or eliminating duplicated data stored to storage system 120 may allow for a more efficient utilization of storage resources.

In some examples, storage device(s) 122 at storage system 120 may include one or more storage devices that may have one or more types of storage mediums configured as solid state or hard disk drives. The types of storage mediums or memory may include, but are not limited to NAND flash, NOR flash, polymer memory such as ferroelectric polymer memory, ferroelectric transistor random access memory (FeTRAM or FeRAM), nanowire, ovonic memory, ferroelectric memory, SONOS memory, magnetic or optical cards, an array of devices such as Redundant Array of Independent Disks (RAID) drives, or any other type of storage medium or memory suitable for storing information such as media content.

According to some examples, communication channel(s) 150 may include one or more wired or wireless communication mediums that may couple to one or more types of networks included in network(s) 150. These one or more networks may operate according to various wired or wireless communication protocols. For these examples, a type of network may include a wire/wireless wide access network such a WAN or WLAN. Another type of network may include a wired/wireless local access network such as a WLAN or LAN.

Figure 2:
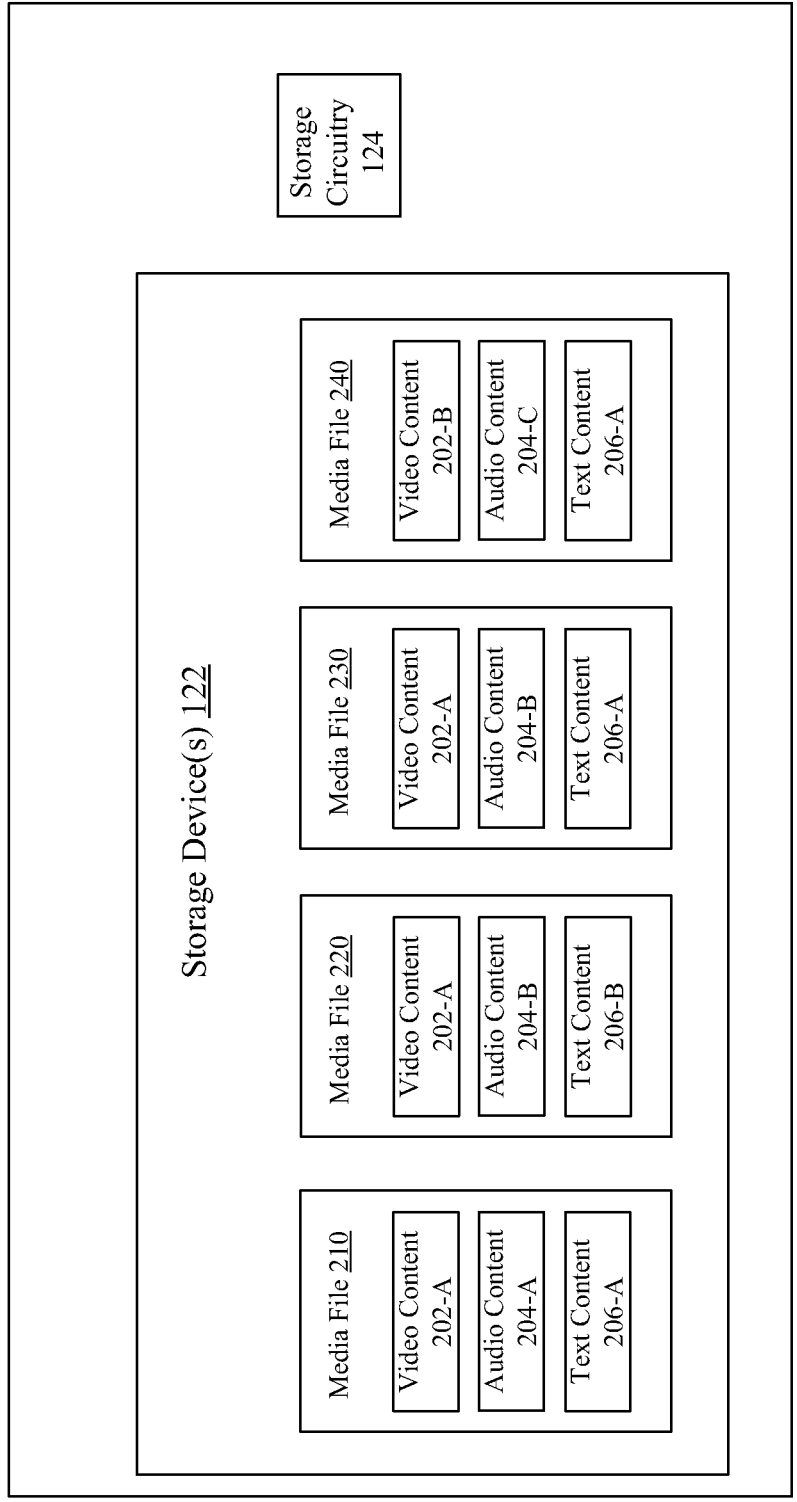
FIG. 2 illustrates an example storage system.

FIG. 2 illustrates an example storage system. As shown in FIG. 2, the example storage system may include storage system 120 that has storage device(s) 122 and storage circuitry 124. According to some examples, as shown in FIG. 2, media files 210, 220, 230 and 240 may be stored at storage device(s) 122. For these examples, as shown in FIG. 2, media files 210 to 240 may include media content such as video content 202, audio content 204 or text content 206. The audio and text content included in each media file may be synched with the video content included in the same media file. For example, audio content 204 and text content 206 of a given media file may be synched with video content 202 of the given media file. Audio content 204 may include one or more audio sequences/samples synched to respective one or more video sequences/samples in video content 202. Also text content 206 may include one or more text sequences/samples synched to the same respective one or more video sequences/samples in video content 202.

In some examples, due to various reasons, media content included in media files 210, 220, 230 or 240 may be duplicated between the media files. For example, as shown in FIG. 2, video content 202-A may be duplicated in media files 210, 220 and 230. Also, audio content 204-B may be duplicated in media files 220 and 230. Meanwhile, text content 206-A may be duplicated in media files 210, 230 and 240. The duplicated media content may result in inefficient use of storage capacity at storage device(s) 122.

According to some examples, video content may consume a significantly larger amount of storage compared to audio or text content. Therefore, if just video content duplication was addressed by identifying that redundant video content 202-A is located in three media files and deleting or not storing video content 202-A in two of the three media files may have significant impact on storage efficiency. As described in more detail below, logic and/or features at storage circuitry 124 may be capable of identifying at least a portion of duplicated media content (e.g., duplicated video content) in media files such as media files 210 to 240.

Figure 3:
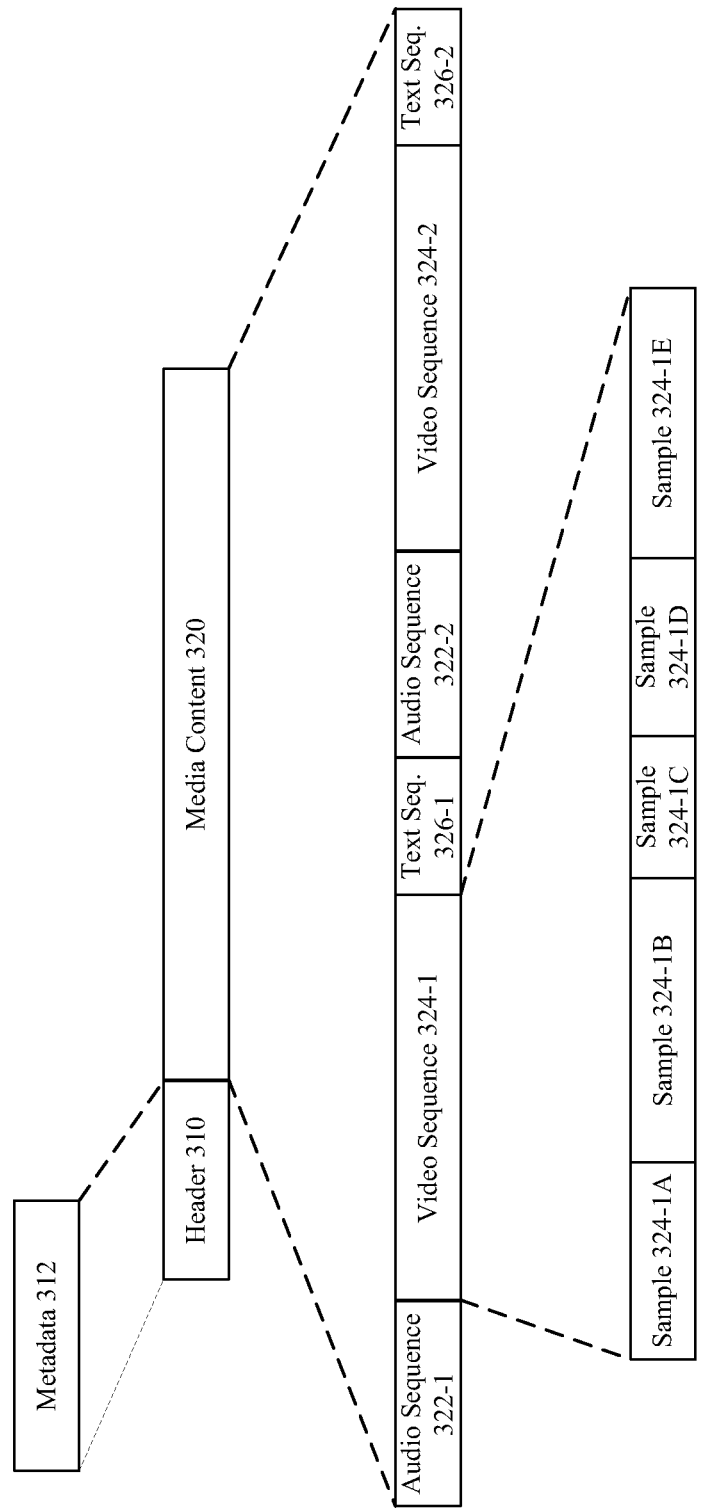
FIG. 3 illustrates an example first format.

FIG. 3 illustrates example first format. As shown in FIG. 3, the example first format includes format 300. In some examples, format 300 may be an example format for a media file. As shown in FIG. 3, format 300 includes a header 310 and media content 320. Also, as shown in FIG. 3, media content 320 may include audio sequences 322-1/322-2, video sequences 324-1/324-2 or text sequences 326-1/326-2. In some examples, any of these audio, video or text sequences may include one or more samples. For simplicity purposes, only video sequence 324-1 having samples 324-1A to 324-1E is shown in FIG. 3. The other audio, video or text sequences may or may not have a similar number of samples.

According to some examples, video sequence 324-1 may be synched with audio sequence 322-1 and text 326-1. Also, for these examples, video sequence 324-2 may be synched with audio sequence 322-2 and text sequence 326-2. In other words, audio and text media content maintained in audio sequence 322-1/322-2 and text sequence 326-1/326-2 may be arranged to be provided contemporaneously with video media content maintained in video sequence 324-1/324-2 when streamed or delivered to an eventual consumer. As a result the audio, video and text sequences may be interleaved, time-ordered, video and audio sequences with associated text.

In some examples, as shown in FIG. 3, header 310 may include metadata 312. As described in more detail below, metadata 312 may include information used to determine locations of the audio, video or text sequences included in media content 320.

In some examples, format 300 may be associated with an industry standard for storing media content. The industry standard may include, but is not limited to a standard by the International Organization for Standardization/International Electrotechnical Commission (ISO/IEC) 14496-12, Information Technology—Coding of Audio-Visual Objects, Part 12: ISO base media file format, Published in July, 2012 (hereinafter "ISO/IEC 14496-12"). ISO/IEC 14496-12 may be used as a type of media file format to store MPEG-4 media files. For these examples, metadata 312 of header 310 may be similar to a Movie Box (moov) and media content 320 may be similar to a Media Data Container (mdat).

FIG. 4 illustrates example a second format. As shown in FIG. 4, the example second format includes format 400. In some examples, format 400 may be associated with a format for metadata included in a header for a media file format. As shown in FIG. 4, metadata 312 from header 310 of example format 300 may be an example of metadata in an example format that utilizes example format 400. For these examples, audio sequence (A.S.) location information 422-1/422-2, video sequence (V.S.) location information 424-1/424-2 or text sequence (T.S.) location information 426-1/426-2 may be included in metadata 312 as shown in FIG. 4.

According to some examples, the location information included in A.S. location information 422-1/422-2, V.S. location information 424-1/424-2 and T.S. location information 426-1/426-2 may identify locations within media content 320 where respective audio sequences 322-1/322-2, video sequences 324-1/324-2 and text sequences 326-1/326-2 may be located for a media file in the example format of format 300. The location information may include an offset from some reference point of a media file in the example format of format 300 that indicates a beginning of a given sequence. For example, an offset of a given number of bytes indicated in V.S. location information 424-1 may indicate the beginning location of video sequence 324-1. The location information may also indicate a size of the given sequence from which the end of the sequence may be determined.

In some examples, A.S. location information 422-1/422-2, V.S. location information 424-1/424-2 and T.S. location information 426-1/426-2 may also include information to indicate the location of one or more samples included in respective audio sequences 322-1/322-2, video sequences 324-1/324-2 and text sequences 326-1/326-2. The sample information may also include offsets that may begin with the first offset being equal to the offset for the given sequence and subsequent samples having respective offsets that reference to that first offset. In other examples, each sample may be the same size. For these examples, the sample information may include information to indicate a number of samples and a uniform size for each sample. Based on the number of samples and the uniform size, the location of each sample in the sequence may then be determined. For example, if V.S. location information 424-1 indicates that video sequence 324-1 includes 5 samples each with a size of 4 bytes, then the location of each of the samples would be offset by 4 bytes following the first sample.

Examples are not limited to the above examples for determining locations of media content sequences based on information included in a header having metadata in the example format of format 400. Other location information is contemplated and the examples described in this disclosure are therefore not limited to the above-mentioned examples for information used to determine a location of a media content sequence or samples included in the media content sequence.

According to some examples, logic and/or features executed by circuitry for a storage system may be capable of parsing a header of a media file in the example format of format 300 to obtained metadata information that may be further parsed to determine locations for media content located within the media file. As described in more detail below, that location information may be used to identify duplicated media content possibly included in a plurality of media files stored or to be stored in the system.

FIG. 5 illustrates example code 500. In some examples, code 500 may be implemented by circuitry for a storage system such as storage circuitry 124 of storage system 120. For these examples, as shown in FIG. 5, the input to the code may be media file information. The media file information may be associated with a first media file of a plurality of media files arranged in one or more media file formats (e.g., format 300) and having duplicated media content with at least some of these media files. The media file information, for example, may be received by the logic and/or features via a media file header. The media file header (e.g., header 310) may be associated with a given media file format (e.g., format 300) utilized by the first media file.

According to some examples, as shown in FIG. 5 for code 500, the media file header may be parsed. For these examples, the parsed media file header may include parsing metadata (e.g., metadata 312) included in the header. The parsed metadata, for example, may include location information to determine locations for audio, video or text media content (e.g., see format 400).

In some examples, a given type of media content sequence may be targeted for deduplication. For example, video sequences/samples included in the plurality of media files may be targeted for deduplication. Also, in some examples, either sequences or samples may be selected for deduplication. Examples are not limited to only video media content for deduplication. Other media content may be targeted with or without also targeting video media content.

According to some examples, if sequences are selected for deduplication, the parsed metadata information may be used to determine location(s) of video sequences in order to pull out or obtain data for these video sequences that may be referred to as "chunks". For these examples, the selection of sequences may result in a sequence-based chunking technique. In other examples, if samples are selected for deduplication, the parsed metadata information may be used to determine locations of video samples located in each sequence to obtain chunks. For these other examples, the selection of samples may result in a sample-based chunking technique.

In some examples, as shown in FIG. 5 for code 500, if a sequence-based chunking technique is selected a hash function such as a secure hash function (SHA) may be applied to a sequence chunk. For the example shown for code 500 the SHA may be SHA-1. For these examples, SHA-1 may be an SHA as described in Federal Information Processing Standards Publication (FIPS PUB) 180-4, Secure Hash Standard, Published in March 2012, ("FIPS PUB 180-4") and/or in later versions of this standard as described in This disclosure is not limited to SHA-1, other SHAs described in FIPS PUB 180-4 or other similar industry standards are contemplated such as SHA-224, SHA-256, SHA-384, SHA-512, SHA-512/224 or SHA-512/256.

According to some examples, as shown in FIG. 5 for code 500, a signature for the sequence may be added to a chunk list. For these examples, the signature may be the results of the SHA-1 being applied to the data or media content included in the given sequence. As described more below, the results or signature for the chunk may be compared to results or signatures for other chunks parsed from other media files. If the results or signatures match, that identifies redundant media content as applying the SHA-1 to the same media content will likely result in a matching result or signature.

In some examples, as shown in FIG. 5 for code 500, if a sample-based chunking technique is selected, an SHA-1 may be applied to each sample chunk. For these examples, results or a signature for the sample chunk may be added to a chunk list. The results or signature for the chunk may be compared to results or signatures for other chunks parsed from other media files using the sample-based chunking technique. If the results or signatures match, that identifies redundant data because applying the SHA-1 to the same data will likely result in a matching result or signature.

Determining whether to target sequences or samples may depend on a combination of factors such as processing capabilities available and the size or number of samples included in each sequence. Also a balance between utilizing more processing power and having finer granularity in finding duplicated media content may be weighed. A large number of samples in each sequence may consume an unacceptable amount of processing power to chunk, apply hash functions, add results of hash function to a chunk list and then compare with other results to find matching results or signatures that identify duplicated media content. Also, storing a large number of samples, each with an SHA-1 signature may defeat some of the efforts to reduce file sizes having redundant media content.

Figure 6:
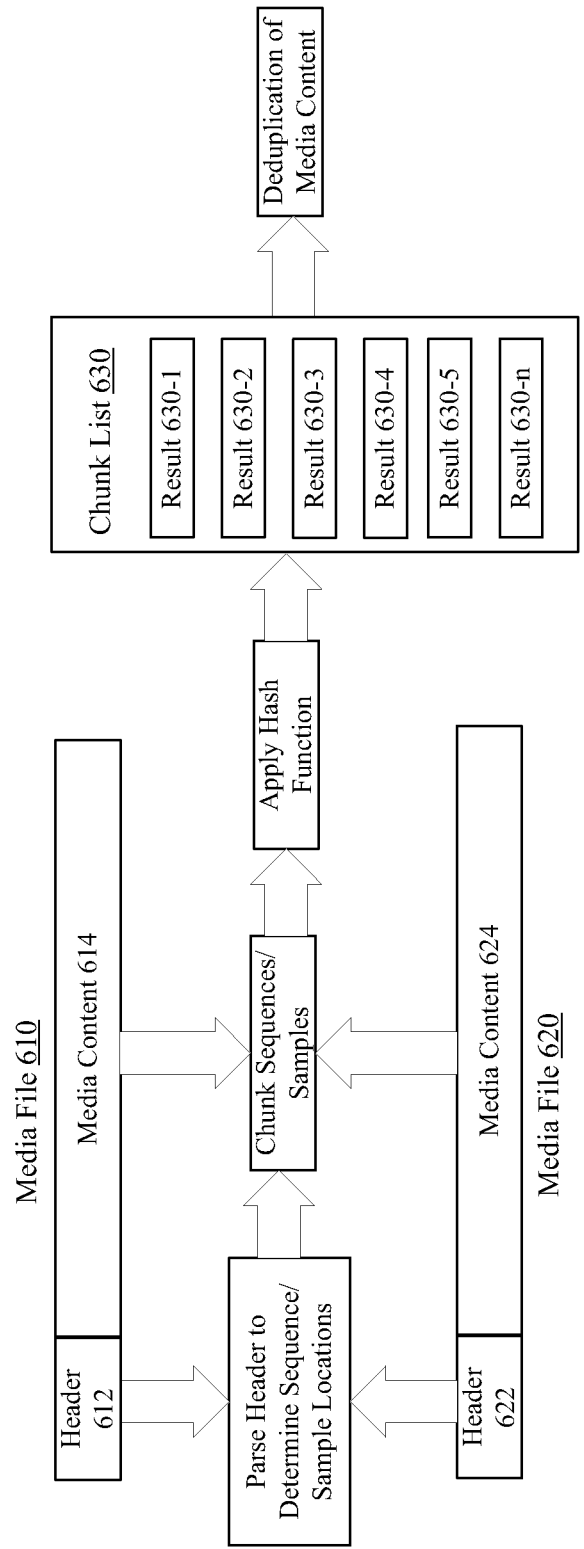
FIG. 6 illustrates an example process.

FIG. 6 illustrates example process 600. In some examples process 600 may be implemented on two media files using code 500 described above for FIG. 5. For these examples, elements of system 100 and/or storage system 120 as shown and described for FIGS. 1 and 2 may be used to implement at least portions of process 600. Also, formats 300 and 400 may be associated with the implementation of process 600. However, the example process 600 illustrated in FIG. 6 is not limited to implementations using elements of system 100, storage system 120 or to formats 300/400 and code 500.

In some examples, as shown in FIG. 6, the two media files are media files 610 and 620. For these examples, media files 610 and 620 may be arranged in example media file format 300 and may have at least some duplicated media content. Also, for these examples, media files 610 and 620 may be stored at or destined to be stored to storage device(s) 122 of storage system 120.

According to some examples, media file 610 may be the first media file to have its header parsed. For these examples, code 300 may be implemented by logic and/or features of storage circuitry 124 to parse header 612. Header 612 may include metadata that indicates locations of sequences and/or samples in media content 614 (e.g., audio, video or text media content). Depending on which chunking technique is being used, either sequences or samples may be chunked from media content 614. Then, as shown in FIG. 6, a hash function (e.g., SHA-1) may be applied to each chunk. Results or signatures for each chunk may then be added to chunk list 630.

In some examples, media file 620 may be the second media file to have its header parsed. The logic and/or features of storage circuitry 124, while implementing code 300, may parse header 622. Header 622 may include metadata that indicates locations of sequences and/or samples in media content 624. Depending on which chunking technique was used to chunk the sequences/samples for media file 620, either sequences or samples may be chunked from media content 624. Then as shown in FIG. 6, a hash function may be applied to each chunk. Results or a signature for each chunk may then be added to chunk list 630.

According to some examples, logic and/or features of storage circuitry 124 may be capable of comparing results or signatures included in results 630-1, 630-2, 630-3, 630-4, 630-5 and 630-*n*, where "n" is any positive whole integer greater than 5. The comparison may determine if any results or signatures match and thus indicate duplicated media content in media files 610 and 620.

In some examples, the results or signatures for each chunk from media file 610 may be the first results added to chunk list 630. In other words, these results may indicate the earlier chunked files and may establish those chunks that are to be stored if chunks from media file 620 were found to have duplicated media content. For example, results 630-1 to 630-3 may be from chunks originating from media file 610 and results 630-4 to 630-*n* may be from chunks originating from media file 620. If result 630-1 matches result 630-4, then the duplicated media content associated with result 630-1 may be stored to storage device(s) 122 and duplicated media content associated with result 630-4 may be deleted from or not stored to storage device(s) 122. The deleting or not storing of the duplicated media content associated with result 630-4 or any other of results 630-5 and 630-*n* that also match may then result in deduplication of media content, at least between media file 610 and 620.

Figure 7:
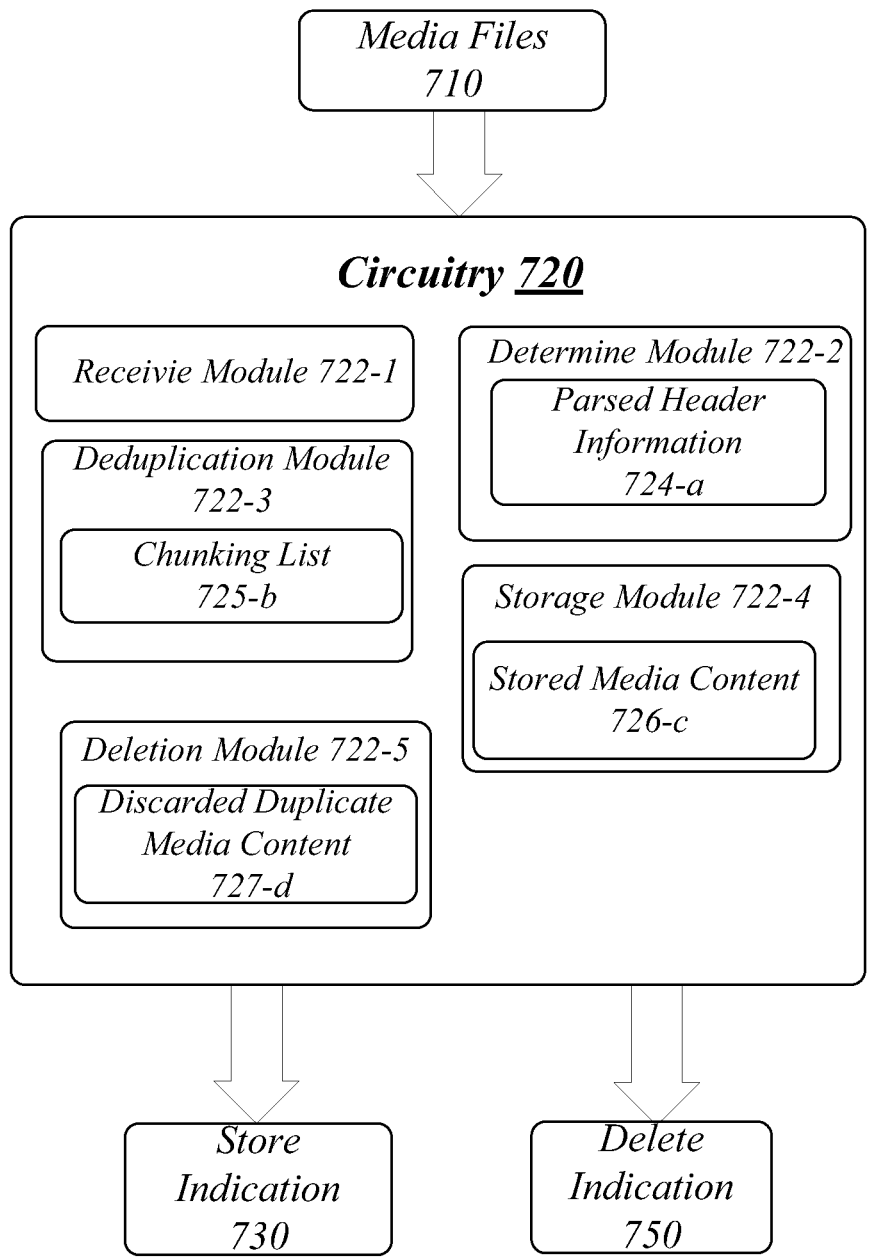
FIG. 7 illustrates an example apparatus.

FIG. 7 illustrates an example apparatus 700. Although the apparatus 700 shown in FIG. 7 has a limited number of elements in a certain topology, it may be appreciated that the apparatus 700 may include more or less elements in alternate topologies as desired for a given implementation.

The apparatus 700 may comprise an apparatus that may encompass at least some of the capabilities mentioned above for the logic and/or features located at storage circuitry 124 of storage system 120 as described for FIGS. 1-6. Apparatus 700 may be arranged to execute one or more software and/or firmware modules 722-*a*. It is worthy to note that "a" and "b" and "c" and similar designators as used herein are intended to be variables representing any positive integer. Thus, for example, if an implementation sets a value for a=5, then a complete set of software modules 722-*a* may include modules 722-1, 722-2, 722-3, 722-4 or 722-5. The examples are not limited in this context.

In some examples, as shown in FIG. 7, apparatus 700 includes circuitry 720. Circuitry 720 may be generally arranged to execute the one or more modules 722-*a*. Circuitry 720 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as circuitry 720. According to some examples circuitry 720 may also include an application specific integrated circuit (ASIC) and modules 722-*a* may be implemented as firmware by hardware elements of the ASIC.

According to some examples, apparatus 700 may include a receive module 722-1. Receive module 722-1 may be executed by circuitry 720 to receive information associated with a plurality of media files separately arranged in one or more media file formats and having duplicated media content. For these examples, the information may be received from headers for media files 710 that may be in a media file format similar to format 300.

In some examples, apparatus 700 may also include a determine module 722-2. Determine module 722-2 may be executed by circuitry 720 to determine locations of media content sequences included in each of the plurality of media files based on respective media file formats. The media content sequences may include video, audio or text media content. For these examples, the locations may be determined based on information parsed from the headers received by receive module 722-1. Determine module 722-2 may at least temporarily maintain the parsed information as parsed header information 724-*a* in a data structure such as a lookup table (LUT).

In some examples, apparatus 700 may also include a deduplication module 722-3. Deduplication module 722-3 may be executed by circuitry 720 to identify at least a portion of duplicated media content in each of the plurality of media files based on the determined locations of the media content sequences. For these examples, deduplication module 722-3 may access parsed header information 724-*a* maintained by determine module 722-2 to determine the locations of the media content sequences or samples and then implement a code similar to code 500 to chunk the sequences or samples, apply a hash function (e.g., SHA-1) and add results for the applied hash function to a chunk list. This process may occur for each media file for which information was received by receive module 722-1. Deduplication module 722-3 may add the results to chunk list 725-b (e.g., maintained in a LUT) and then compare the results to determine matches. Deduplication module 722-3 may then identify chunks having matching results as having duplicated media content According to some examples, apparatus 700 may also include a storage module 722-4 to cause identified duplicated media content to be stored to a storage system for a first media file from among the plurality of media files. For these examples, deduplication module 722-3 may indicate matching results that correspond to the first media file and therefore are still stored even if duplicated by other, subsequent media files. Also, storage module 722-4 may receive an indication from deduplication module 722-3 of which results do not result in a match. Storage module 722-4 may at least temporarily store information associated with these identified chunks in stored media content 726-c (e.g., in a LUT). In some examples, store indication 730 may be sent or forwarded to storage devices to indicate which media content from the plurality of media files may be stored to or remained stored at the storage system.

In some examples, apparatus 700 may also include a deletion module 722-5. Deletion module 722-5 may be executed by circuitry 720 to cause identified duplicated media content for all other media files among the plurality of media files to be deleted from or not stored to the storage system. For these examples, deduplication module 722-3 may indicate matching results that correspond to all non-first media files. Delete module 722-5 may at least temporarily store information associated with these identified chunks in discarded duplicated media content 727-d (e.g., in a LUT). In some examples, delete indication 750 may be sent or forwarded to storage devices to indicate which media content from the plurality of media files is to be deleted or not stored to the storage system.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates a logic flow 800. Logic flow 800 may be representative of some or all of the operations executed by one or more logic, features, or devices described herein, such as apparatus 700. More particularly, logic flow 800 may be implemented by receive module 722-1, determine module 722-2, deduplication module 722-3, storage module 722-4 or delete module 722-5.

In some examples, logic flow 800 at block 802 may receive information associated with a plurality of media files separately arranged in one or more media file formats and having duplicated media content. For these examples, receive module 722-1 may receive the information (e.g., from a header).

According to some examples, logic flow 800 at block 804 may determine locations of media content sequences included in each of the plurality of media files based on respective media file formats, the media content sequences including video, audio or text media content. For these examples, determine module 722-2 may determine locations (e.g., using parsed header information such a metadata).

According to some examples, logic flow 800 at block 806 may identify at least a portion of the duplicated media content in each of the plurality of media files based on the determined locations of the media content sequences. For these examples, deduplication module 722-3 may identify the duplicated media content.

In some examples, logic flow 800 at block 808 may store identified duplicated media content at a storage system for a first media file from among the plurality of media files. For these examples, storage module 722-4 may cause the identified duplicated media content for the first media file to be stored to the storage system.

According to some examples, logic flow 800 at block 810 may cause identified duplicated media content for all other media files among the plurality of media files to be deleted from or not stored to the storage system. For these examples, deletion module 722-5 may cause the identified duplicated media content for all the other media files to be deleted from or not stored to the storage system.

Figure 9:
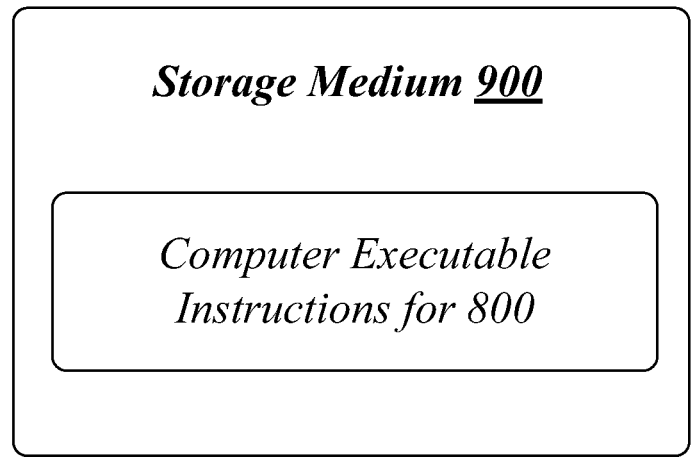
FIG. 9 illustrates an example storage medium.

FIG. 9 illustrates an embodiment of a storage medium 900. The storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
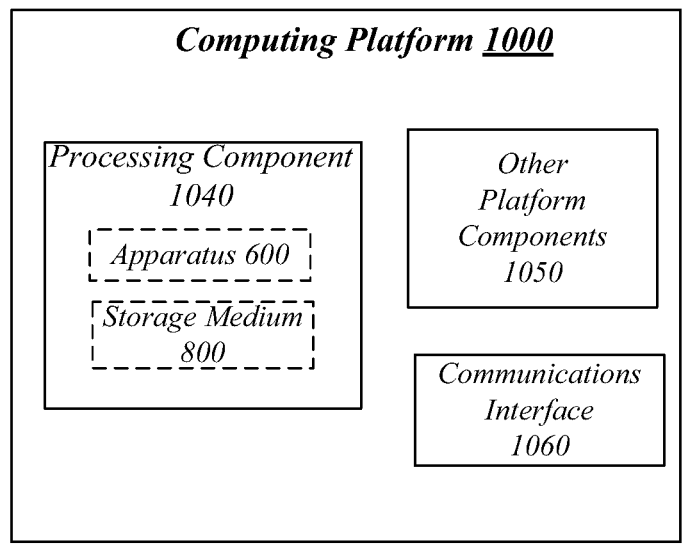
FIG. 10 illustrates an example computing platform.

FIG. 10 illustrates an example computing device 1000. In some examples, as shown in FIG. 10, computing device 1000 may include a processing component 1040, other platform components 1050 or a communications interface 1060.

According to some examples, processing component 1040 may execute processing operations or logic for apparatus 700 and/or storage medium 900. Processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units associated with either other platform components 1050 may include without limitation, various types of computer readable and machine readable storage media in the form of one or more higher speed memory units, such as ROM, RAM, DRAM, Double-Data-Rate DRAM (DDRAM), synchronous DRAM (SDRAM), SRAM, programmable ROM (PROM), EPROM, EEPROM, NAND flash memory, NOR flash memory, polymer memory such as ferroelectric polymer memory, ferroelectric transistor random access memory (FeTRAM or FeRAM), nanowire, ovonic memory, ferroelectric memory, 3-dimensional cross-point memory, SONOS memory, magnetic or optical cards, an array of devices such as Redundant Array of Independent Disks (RAID) drives, solid state memory devices (e.g., USB memory), SSDs and any other type of storage media suitable for storing information.

In some examples, communications interface 1060 may include logic and/or features to support a communication interface. For these examples, communications interface 1060 may include one or more communication interfaces that operate according to various communication protocols or standards to communicate over direct or network communication links. Direct communications may occur via use of communication protocols or standards described in one or more industry standards (including progenies and variants) to include the Peripheral Component Interconnect (PCI) Express Base Specification, revision 3.0, published in November 2010 ("PCI Express" or "PCIe"), the Universal Serial Bus Specification, revision 3.0, published in November 2008 ("USB"), the Serial ATA (SATA) Specification, revision 3.1, published in July 2001, Request for Comments (RFC) 3720, Internet Small Computer System Interface (iSCSI), published in April 2004 and/or the Serial Attached SCSI (SAS) Specification, revision 2.1, published in December 2010. Network communications may occur via use of various communication protocols and may operate in compliance with one or more promulgated standards or specifications for wired or wireless networks by the Institute of Electrical Engineers (IEEE). These standards are specifications may include, but are not limited to, IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, later versions of this standard ("IEEE 802.11") for wireless mediums or IEEE 802.3-2012, Carrier sense Multiple access with Collision Detection (CSMA/CD) Access Method and Physical Layer Specifications, Published in December 2012 (hereinafter "IEEE 802.3") for wired mediums, one or more protocols that may encapsulate Fibre Channel frames over Ethernet networks referred to as fiber channel over Ethernet (FCoE), compatible with the protocols described by the American National Standard of Accredited Standards Committee INCITS T11 Technical Committee, Fibre Channel Backbone-5 (FC-BB-5) Standard, Revision 2.0, published June 2009 and/or protocols associated with RFC 3530, Network File System (NFS), version 4 Protocol, published in April 2003.

Computing device 1000 may be part of a system or device that may be, for example, user equipment, a computer, a personal computer (PC), a desktop computer, a laptop computer, a notebook computer, a netbook computer, a tablet computer, a tablet, a portable gaming console, a portable media player, a smart phone, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing device 1000 described herein, may be included or omitted in various embodiments of computing device 1000, as suitably desired.

The components and features of computing device 1000 may be implemented using any combination of discrete circuitry, application specific integrated circuits (ASICs), logic gates and/or single chip architectures. Further, the features of computing device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   selectively performing a deduplication process upon a first subset of a first media file and a second subset of a second media file based upon the first subset of the first media file and the second subset of the second media file comprising data sequences having a same type of media content, wherein the deduplication process skips processing remaining portions of the first media file and the second media file having types of media content different than the type of media content of the first subset of the first media file and the second subset of the second media file.

2. The method of claim 1, wherein the selectively performing a deduplication process comprises:
   applying a hash function to chunks within a first set of chunks chunked from the first subset of the media file and a second set of chunks chunked from the second subset of the second media to obtain signatures for each of the chunks, wherein a first chunk of the first set of chunks is retained and a second chunk of the second set of chunks is deleted as being redundant based upon signatures of the first chunk and the second chunk matching.

3. The method of claim 1, wherein the selectively performing a deduplication process comprises:
   controlling the deduplication process to refrain from comparing the first subset of the media file to the remaining portions of the first media file and the second media file having types of media content different than the type of media content of the first subset of the media file.

4. The method of claim 2, comprising:
   chunking the first subset of the media file into a set of samples within the first subset of the media file as the first set of chunks.

5. The method of claim 4, wherein the metadata is parsed to locate samples within the first subset of the media file.

6. The method of claim 1, wherein the first type of media content corresponds to audio media content.

7. The method of claim 1, wherein the first type of media content corresponds to text media content.

8. A computing device comprising:
a processor; and
memory operatively coupled to the processor, the memory storing instructions that in response to being executed by the processor cause the computing device to:
selectively perform a deduplication process upon a first subset of a first media file and a second subset of a second media file based upon the first subset of the first media file and the second subset of the second media file comprising data sequences having a same type of media content, wherein the deduplication process skips processing remaining portions of the first media file and the second media file having types of media content different than the type of media content of the first subset of the first media file and the second subset of the second media file.

9. The computing device of claim 8, wherein the instructions cause the computing device to:
control the deduplication process to refrain from comparing the first subset of the media file to the remaining portions of the first media file and the second media file having types of media content different than the type of media content of the first subset of the media file.

10. The computing device of claim 8, wherein the instructions cause the computing device to:
apply a hash function to chunks within a first set of chunks chunked from the first subset of the media file and a second set of chunks chunked from the second subset of the second media to obtain signatures for each of the chunks, wherein a first chunk of the first set of chunks is retained and a second chunk of the second set of chunks is deleted as being redundant based upon signatures of the first chunk and the second chunk matching.

11. The computing device of claim 10, wherein the instructions cause the computing device to:
chunk the first subset of the media file into a set of samples within the first subset of the media file as the first set of chunks.

12. The computing device of claim 8, wherein the type of media content corresponds to video media content.

13. A non-transitory machine readable medium comprising instructions that in response to being executed by a system cause the system to:
selectively perform a deduplication process upon a first subset of a first media file and a second subset of a second media file based upon the first subset of the first media file and the second subset of the second media file comprising data sequences having a same type of media content, wherein the first deduplication process skips processing remaining portions of the first media file and the second media file having types of media content different than the type of media content of the first subset of the first media file and the second subset of the second media file.

14. The non-transitory machine readable medium of claim 13, wherein the instructions further cause the system to:
apply a hash function to chunks within a first set of chunks chunked from the first subset of the media file and a second set of chunks chunked from the second subset of the second media to obtain signatures for each of the chunks,
wherein a first chunk of the first set of chunks is retained and a second chunk of the second set of chunks is deleted as being redundant based upon signatures of the first chunk and the second chunk matching.

15. The non-transitory machine readable medium of claim 14, wherein the hash function comprises an SHA-1 secure hash algorithm.

16. The non-transitory machine readable medium of claim 13, wherein the instructions further cause the system to:
control the deduplication process to refrain from comparing the first subset of the media file to the remaining portions of the first media file and the second media file having types of media content different than the type of media content of the first subset of the media file.

17. The non-transitory machine readable medium of claim 14, wherein the instructions further cause the system to:
chunk the first subset of the media file into a set of samples within the first subset of the media file as the first set of chunks.

18. The non-transitory machine readable medium of claim 13, wherein the type of media content is a video media type.

19. The non-transitory machine readable medium of claim 13, wherein the instructions further cause the system to:
deduplicate a third subset of the first media file and a fourth subset of the second media file together by a second deduplication process based upon the third and fourth subsets having a same second type of media content.

20. The non-transitory machine readable medium of claim 19, wherein the second deduplication process skips other portions of the first media file and the second media file having types of media content different than the second type of media content of the third and fourth subsets.

* * * * *